United States Patent

Lee

(10) Patent No.: US 9,390,746 B2
(45) Date of Patent: Jul. 12, 2016

(54) GATE STRUCTURE AND ELECTRONIC DEVICE USING THE SAME

(71) Applicant: Getac Technology Corporation, Hsinchu County (TW)

(72) Inventor: Kun-Cheng Lee, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 81 days.

(21) Appl. No.: 14/594,753

(22) Filed: Jan. 12, 2015

(65) Prior Publication Data

US 2016/0027465 A1    Jan. 28, 2016

(30) Foreign Application Priority Data

Jul. 28, 2014    (CN) .......................... 2014 1 0364077

(51) Int. Cl.
| | |
|---|---|
| *G11B 17/04* | (2006.01) |
| *G06F 1/16* | (2006.01) |
| *G11B 33/02* | (2006.01) |
| *G11B 17/043* | (2006.01) |
| *G11B 17/032* | (2006.01) |

(52) U.S. Cl.
CPC ........ *G11B 17/04* (2013.01); *G06F 1/16* (2013.01); *G11B 17/0405* (2013.01); *G11B 33/027* (2013.01); *G11B 17/032* (2013.01); *G11B 17/043* (2013.01); *G11B 17/0436* (2013.01)

(58) Field of Classification Search
None
See application file for complete search history.

(56) References Cited

U.S. PATENT DOCUMENTS

| | | | | | |
|---|---|---|---|---|---|
| 5,862,468 | A  * | 1/1999 | Kim | ...................... | H04B 1/082 312/7.1 |
| 7,312,947 | B2 * | 12/2007 | Jansen | ............... | G11B 15/6825 360/92.1 |
| 7,490,337 | B2 * | 2/2009 | Lee | ...................... | G11B 33/027 720/646 |
| 7,611,100 | B2 * | 11/2009 | Peng | .................... | G11B 33/124 211/41.17 |
| 8,345,421 | B2 * | 1/2013 | Tai | .......................... | G06F 1/181 292/DIG. 37 |
| 8,495,666 | B1 * | 7/2013 | Fan | ...................... | G11B 17/056 720/646 |
| 8,869,368 | B2 * | 10/2014 | Suzuki | ............... | G11B 15/6835 29/426.5 |

\* cited by examiner

*Primary Examiner* — Carlos E Garcia (74) *Attorney, Agent, or Firm* — Locke Lord LLP; Tim Tingkang Xia, Esq.

(57) ABSTRACT

An electronic and a gate structure including a first door-leaf, a second door-leaf, and a latch are provided. The first door-leaf having three first locking portions is movably assembled to an entrance of an object. The second door-leaf having two second locking portions is movably disposed at the first door-leaf, such that the first door-leaf closes or opens the entrance. The latch having a third locking portion and a fourth locking portion is movably disposed on the first door-leaf and between the first and the second door-leaves. The first locking portions are located on a moving path of the third locking portion. The second door-leaf is locked to the object and the third locking portion is located at the middle one of the three first locking portions, the fourth locking portion is blocked with one second locking portion and the first door-leaf covers the entrance.

20 Claims, 7 Drawing Sheets

GATE STRUCTURE AND ELECTRONIC DEVICE USING THE SAME

CROSS-REFERENCE TO RELATED APPLICATIONS

This non-provisional application claims priority under 35 U.S.C. §119(a) on Patent Application No(s). 201410364077.7 filed in China on Jul. 28, 2014, the entire contents of which are hereby incorporated by reference.

BACKGROUND OF THE INVENTION

1. Field of the Invention

The present invention relates to gate structures, and more particularly, to a gate structure for an electronic device.

2. Description of the Prior Art

In general, electronic devices for use with rugged computers must meet more and even harsher manufacturing criteria than commercially-available electronic devices. Hence, when it comes to designing rugged electronic devices and general electronic devices, it is necessary to understand that rugged electronic devices are different from general electronic devices in terms of needs and requirements and design rugged electronic devices by taking into account their respective features.

For instance, rugged notebook computers are intended for use in adverse environments, such as humid or dusty surroundings. Hence, rugged notebook computers come with stricter waterproof, shockproof, and dustproof requirements than general notebook computers. By contrast, the low weight and compactness considerations regarded as essential for general notebook computers are unimportant to rugged notebook computers. Therefore, rugged notebook computer designers give top priority to the waterproof, shockproof, and dustproof functionality of rugged notebook computers.

Therefore, the casing of a conventional rugged notebook computer usually features a waterproof structure for attaining waterproof and dustproof effects on an electronic accessory disposed in the conventional rugged notebook computer.

SUMMARY OF THE INVENTION

The present invention provides a gate structure adapted to open and close a cavity of an object. The gate structure comprises a first door-leaf, a second door-leaf, and a latch. The first door-leaf is movably disposed in the cavity of the object. The first door-leaf has three first locking portions. The second door-leaf is disposed at the first door-leaf movably along a first axis. The second door-leaf is engaged with the object or released from the object, such that the first door-leaf closes or opens the cavity. The second door-leaf has two second locking portions. The latch is disposed at the first door-leaf movably along a second axis. The latch is disposed between the first door-leaf and the second door-leaf. The latch has a third locking portion and a fourth locking portion. The first axis is different from the second axis. The three first locking portions are arranged along the second axis. The three first locking portions are located on a moving path of the third locking portion along the second axis. When the second door-leaf is engaged with the object and the third locking portion is positioned at the middle one of the first locking portions, the fourth locking portion is blocked on a moving path of one of second locking portions along the first axis, such that the first door-leaf covers the cavity and is fixed thereto.

The electronic device of the present invention comprises a body and two gate structures. The gate structures each comprise a first door-leaf, a second door-leaf, and a latch. The first door-leaf is movably disposed in a cavity of the body. The first door-leaf has three first locking portions. The second door-leaf is disposed at the first door-leaf movably along a first axis. The second door-leaf is engaged with the body or released from the body, such that the first door-leaf closes or opens the cavity. The second door-leaf has two second locking portions. The latch is disposed at the first door-leaf movably along a second axis and disposed between the first door-leaf and the second door-leaf. The latch has a third locking portion and a fourth locking portion. The first axis is different from the second axis. The three first locking portions are arranged along the second axis and located on a moving path of the third locking portion along the second axis. When the second door-leaf is engaged with the body and the third locking portion is positioned at the middle one of the first locking portions, the fourth locking portion is blocked on a moving path of one of the second locking portions along the first axis, such that the first door-leaf covers the cavity and is fixed thereto. The two latches of the two gate structures move along the second axis and in a first direction, such that the third locking portion moves to the middle one of the first locking portions.

In an embodiment of the present invention, the first door-leaf is pivotally connected to the object and disposed at one side of the cavity.

In an embodiment of the present invention, the first door-leaf has a receiving chamber which faces the second door-leaf. The latch is disposed in the receiving chamber and moves along the second axis. The three first locking portions are disposed at the upper edge of the receiving chamber.

In an embodiment of the present invention, the gate structures further comprises a push lever which has a pushing portion and a connecting portion. The connecting portion passes through a slot of the second door-leaf to connect with the latch. The pushing portion is disposed on a side of the second door-leaf, wherein the side of the second door-leaf faces opposed the first door-leaf.

In an embodiment of the present invention, the slot extends along the second axis.

In an embodiment of the present invention, the first axis is perpendicular to the second axis.

In an embodiment of the present invention, when the third locking portion of the latch moves along the second axis from the middle one of the first locking portions to one of the remaining ones of the first locking portions, the fourth locking portion exits the moving path of one of the second locking portions along the first axis, such that the second door-leaf is released from the object, wherein the two latches of the two gate structures move along the second axis in the other direction.

In an embodiment of the present invention, the second door-leaf further has a fifth locking portion disposed at the upper edge of the second door-leaf, and the object has a sixth locking portion, wherein the fifth locking portion matches the sixth locking portion, such that the second door-leaf is engaged with the object.

In an embodiment of the present invention, the latch further has a hollowed-out portion extending along the second axis and disposed alongside the third locking portion.

In an embodiment of the present invention, the latch further has a limiting portion extending along the second axis and disposed opposite to the fourth locking portion.

In an embodiment of the present invention, the first door-leaf is pivotally connected to the body and disposed at one side of the cavity.

In an embodiment of the present invention, when the third locking portion of the latch moves along the second axis from the middle one of the first locking portions to one of the remaining ones of the first locking portions, the fourth locking portion exits the moving path of one of the second locking portions along the first axis, such that the second door-leaf is released from the body, wherein the two latches of the two gate structures move along the second axis in the other direction.

In an embodiment of the present invention, the second door-leaf further has a fifth locking portion disposed at the upper edge of the second door-leaf, and the body has a sixth locking portion, wherein the fifth locking portion matches the sixth locking portion, such that the second door-leaf is engaged with the body.

In an embodiment of the present invention, the body has a mirroring plane disposed between the two lateral surfaces. The two latches of the two gate structures have mirror symmetry about the mirroring plane.

In an embodiment of the present invention, the latches each have a first surface and a second surface opposing the first surface. In one of the gate structures, the first surface of the latch is in contact with the first door-leaf, whereas the second surface of the latch is in contact with the second door-leaf. In the other gate structure, the second surface of the latch is in contact with the first door-leaf, whereas the first surface of the latch is in contact with the second door-leaf.

Accordingly, in the aforesaid embodiments of the present invention, the gate structures provide effective protection to an electronic accessory disposed inside an electronic device, wherein latches operate in conjunction with locking portions of door-leaves, respectively, such that the door-leaves cover a cavity of the electronic device and are fixed thereto. Furthermore, the present invention gives considerations to a user's operation behavior and thus discloses identical latches and door-leaves, such that the gate structures disposed at two opposing sides of the electronic device can be pushed and moved in the same direction by the user in order to get engaged with a gate or open the gate. Accordingly, the present invention is advantageous in that, not only does the production process dispense with the design and the manufacturing of a symmetrical structure so as to enhance efficiency and cut costs, but the present invention also suits the user's operation behavior.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE EMBODIMENTS

Figure 1:
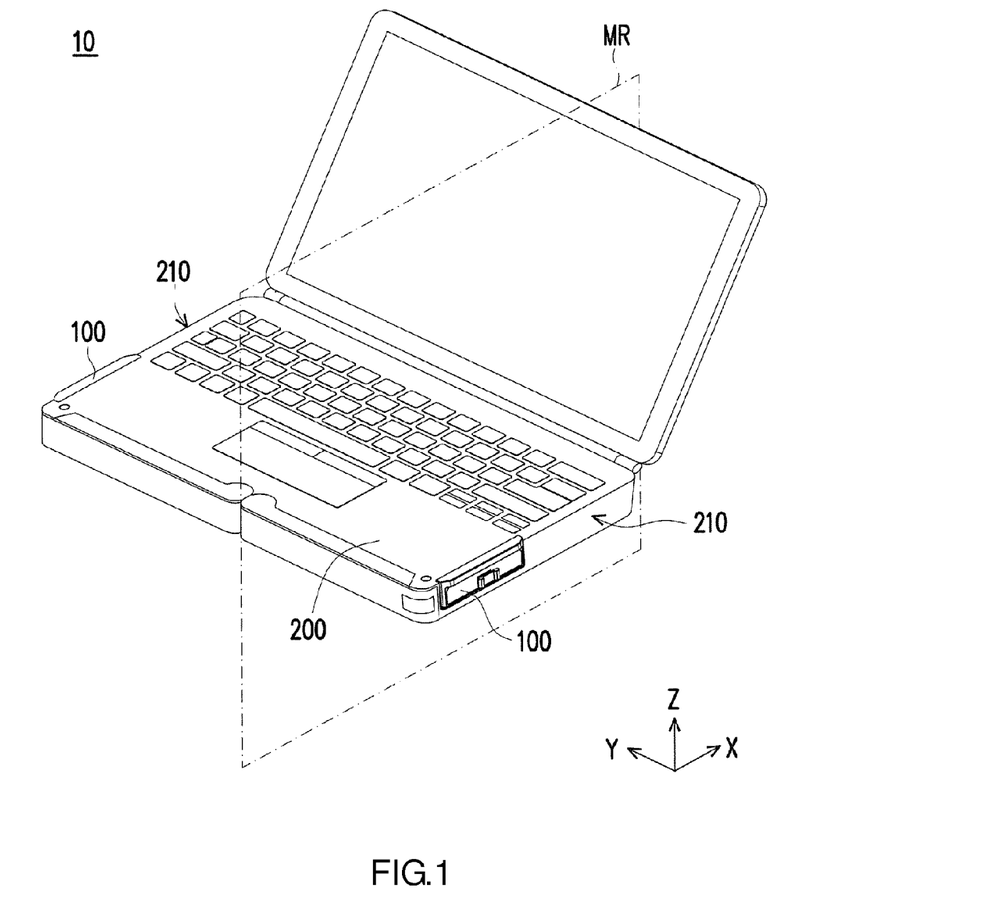
FIG. 1 is a schematic view of an electronic device according to an embodiment of the present invention.
Figure 2:
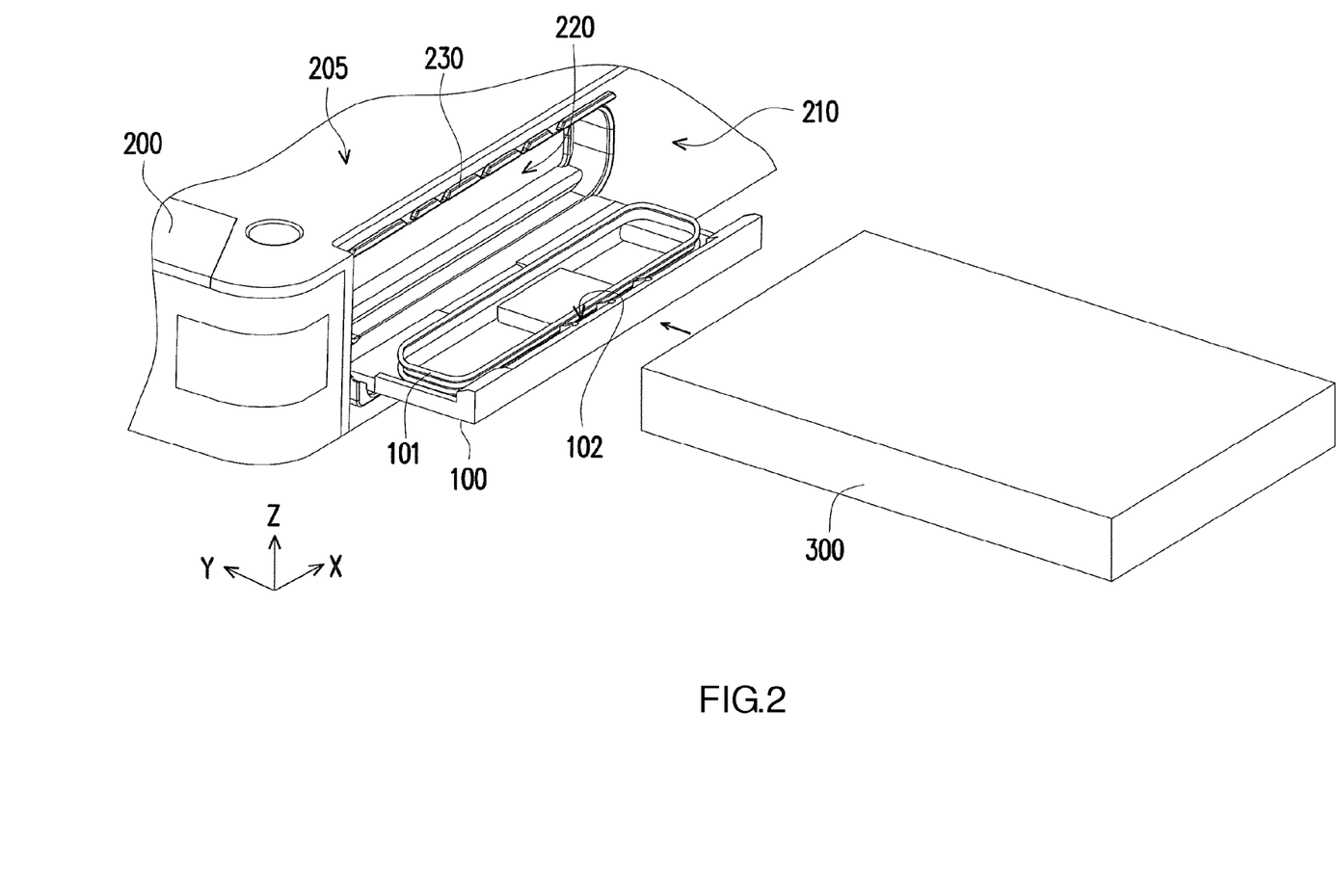
FIG. 2 is a schematic view of the electronic device of FIG. 1 in another status.

FIG. 1 is a schematic view of an electronic device according to an embodiment of the present invention. FIG. 2 is a schematic view of the electronic device of FIG. 1 in another status. The diagrams show the statuses in which the electronic device receives related electronic accessories and provide a Cartesian coordinate system for depicting the relationships between related components. Referring to FIG. 1 and FIG. 2, in this embodiment, electronic device 10 is, for example, a rugged notebook computer which comprises body 200 and two gate structures 100. Body 200 has two opposing lateral surfaces 210 and cavity 220 disposed on lateral surfaces 210. Cavity 220 is in communication with internal space of body 200 and external surroundings, such that electronic accessory 300 (such as a floppy disk drive or a CD-ROM drive) enters and exits body 200 through cavity 220. Hence, electronic accessory 300 is inserted into the internal space of body 200 through cavity 220 and thus hermetically disposed inside body 200 by gate structures 100 in a protected, i.e., dustproof and waterproof, manner.

Referring to FIG. 2, hermetic seal tape 101 is disposed on the inner surface of gate structure 100, and fifth locking portion 102 is disposed at a lateral edge of gate structure 100, such that gate structure 100 is effectively fixed to cavity 220 and adapted to provide a hermetic seal to the internal space of body 200. The present invention is not restrictive of the type of the electronic device. The present invention will work, provided that the gate structure disposed at an object protects any related accessory disposed inside the object. Furthermore, the present invention is not restrictive of the position and quantity of gate structures 100 disposed at the object. Hence, due to the related features of the embodiments of the present invention, gate structures 100 can be easily and effectively provided in accordance with the required quantity and the required positions, as described in detail later.

Figure 3:
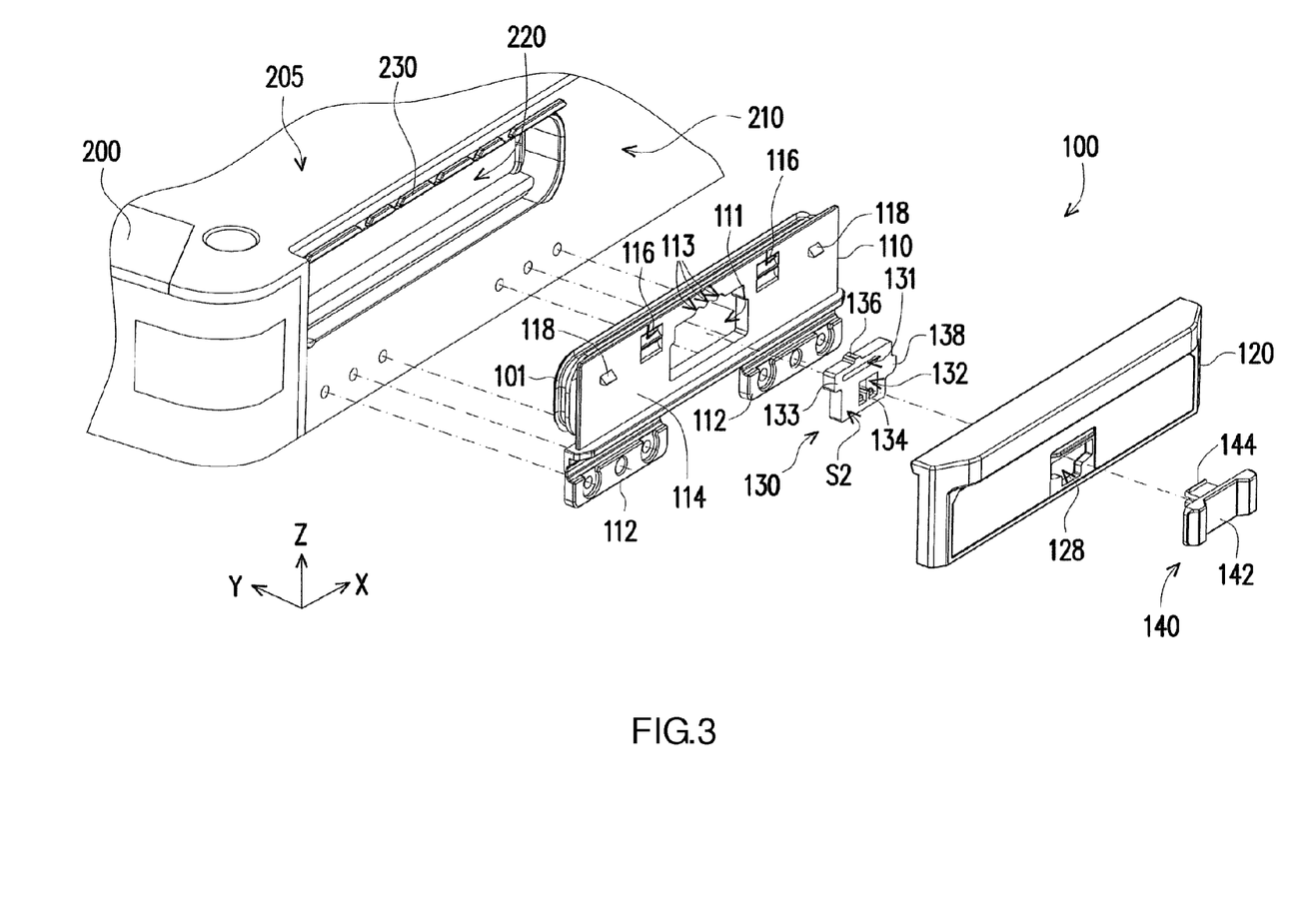
FIG. 3 is a schematic exploded view of a gate structure for the electronic device of FIG. 2.

FIG. 3 is a schematic exploded view of a gate structure for the electronic device of FIG. 2. Referring to FIG. 1 through FIG. 3, in this embodiment, gate structure 100 comprises first door-leaf 110, second door-leaf 120, and latch 130. First door-leaf 110 is movably disposed in cavity 220 of body 200. First door-leaf 110 comprises pivotally connecting units 112 and plate 114. Pivotally connecting units 112 are disposed on lateral surfaces 210 of body 200, respectively. Due to pivotally connecting units 112, plate 114 rotates relative to body 200. Hence, first door-leaf 110 rotates about X-axis and thus flips in a manner shown in FIG. 1 and FIG. 2 to open or close cavity 220. As soon as first door-leaf 110 closes cavity 220, second door-leaf 120 gets disposed at first door-leaf 110 movably along Z-axis, such that gate structure 100 is engaged with body 200 or released from body 200.

Figure 4:
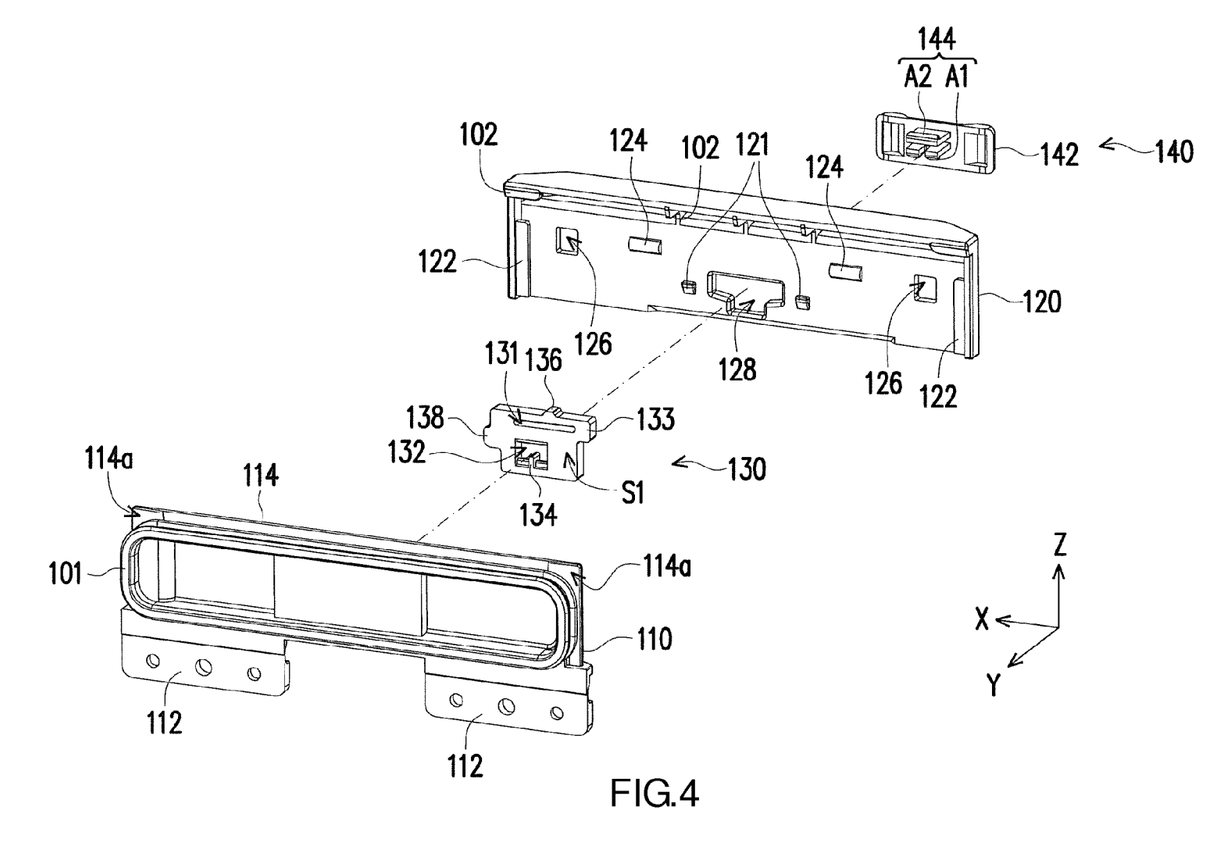
FIG. 4 is an exploded view of the gate structure shown in FIG. 3 but viewed from another angle.

FIG. 4 is an exploded view of the gate structure shown in FIG. 3 but viewed from another angle. Referring to FIG. 2 through FIG. 4, fifth locking portion 102 in FIG. 4 is disposed at the upper edge on the inner side of second door-leaf 120. As shown in the diagram, fifth locking portion 102 is provided in the number of five, namely three at the middle of the upper edge, and two at the two opposing sides of the upper edge, respectively. When its image is projected on Y-Z plane, fifth locking portion 102 exhibits a cross-sectional outline which looks inverted L-shaped substantially. Conversely, sixth locking portion 230 (provided in the form of multiple locking strips arranged along X-axis as shown in FIG. 2 and FIG. 3) is disposed at the upper edge (i.e., the junction of top surface 205 and lateral surfaces 210) of body 200, such that fifth locking portion 102 is engaged with sixth locking portion 230, and in consequence second door-leaf 120 is fixed to body 200, thereby allowing gate structures 100 to be fixed to lateral surfaces 210 of body 200, respectively.

Therefore, after a user has inserted electronic accessory 300 into the internal space of body 200 through cavity 220, gate structures 100 shown in FIG. 2 flip about X-axis. Then, as soon as first door-leaf 110 closes cavity 220, fifth locking portion 102 moves to the upper edge of body 200. Afterward, the user presses second door-leaf 120 along Z-axis negatively, such that fifth locking portion 102 gets fastened to sixth locking portion 230 of body 200, and in consequence gate structures 100 cover cavity 220 and are fixed thereto (as shown in FIG. 1.)

Referring to FIG. 3 and FIG. 4, second door-leaf 120 has two opposing guiding ribs 122 which face first door-leaf 110, and first door-leaf 110 has two guiding portions 114a disposed at two opposing sides of plate 114, respectively. After first door-leaf 110 and second door-leaf 120 have been put together, guiding ribs 122 and guiding portions 114a are slidably fastened to each other, respectively, such that guiding ribs 122 are disposed between hermetic seal tape 101 and guiding portions 114a, thereby allowing second door-leaf 120 to slide relative to first door-leaf 110 upward and downward (i.e., along Z-axis.) Second door-leaf 120 further has first positioning portion 124 (provided in the form of a partial cylindrical protruding structure as shown in the diagram) which faces first door-leaf 110. First door-leaf 110 further has second positioning portion 116 (provided in the form of twin partial cylindrical recesses as shown in the diagram) which faces second door-leaf 120. First positioning portion 124 moves within second positioning portion 116 to and fro and thus functions as a positioning mechanism (whereby the partial cylindrical protruding structure is positioned in one of the twin partial cylindrical recesses) for moving second door-leaf 120 relative to first door-leaf 110 (along Z-axis.)

First door-leaf 110 further has first blocking portion 118 (provided in the form of a wedge protruding structure as shown in the diagram). Second door-leaf 120 further has second blocking portion 126 (provided in the form of a cavity shown in the diagram.) First blocking portion 118 and second blocking portion 126 correspond in position to each other. First blocking portion 118 is movably received in second blocking portion 126. First blocking portion 118 has a flat surface which faces the lower edge of second blocking portion 126; hence, when first blocking portion 118 and second blocking portion 126 move relative to each other, the flat surface of first blocking portion 118 abuts against the lower edge of second blocking portion 126 and thus blocks first blocking portion 118 and second blocking portion 126. That is to say, when second door-leaf 120 moves relative to first door-leaf 110 along Z-axis positively and is eventually released from body 200, the blocking of first blocking portion 118 and second blocking portion 126 prevents second door-leaf 120 from moving further along Z-axis positively and eventually separating from first door-leaf 110.

Referring to FIG. 3 and FIG. 4, in this embodiment, latch 130 is disposed, movably along X-axis, in receiving chamber 111 of first door-leaf 110. Receiving chamber 111 and hermetic seal tape 101 are disposed on two opposing surfaces of plate 114, respectively. Receiving chamber 111 faces second door-leaf 120. Gate structure 100 further comprises push lever 140. Push lever 140 includes pushing portion 142 and connecting portion 144. Connecting portion 144 passes through slot 128 of second door-leaf 120 to get connected to latch 130. Slot 128 extends along X-axis. Pushing portion 142 is disposed one a side of second door-leaf 120, wherein the side of second door-leaf 120 faces opposed first door-leaf 110.

Referring to FIG. 4, connecting portion 144 has first segment A1 and second segment A2, whereas latch 130 has slot 132 and protruding portion 134 disposed in slot 132. Second segment A2 is fastened to protruding portion 134, whereas first segment A1 is engaged with the lateral edge of slot 132, such that latch 130 and push lever 140 are coupled together. Therefore, the user exerts a force on pushing portion 142 of push lever 140 to controllably drive latch 130 to move within receiving chamber 111 to and fro.

First door-leaf 110 further has three first locking portions 113. Referring to FIG. 3, three first locking portions 113 are provided in the form of three semicircular concave portions, respectively, disposed at the upper edge of receiving chamber 111, and arranged along X-axis. Second door-leaf 120 further has two second locking portions 121 disposed on the same surface as first positioning portion 124 (i.e., facing away from protruding portion 134.) Upon completion of the assembly of gate structure 100, two second locking portions 121 are disposed along X-axis and thus at two opposing sides of latch 130. Latch 130 disposed between first door-leaf 110 and second door-leaf 120 further has third locking portion 136 and fourth locking portion 138. Third locking portion 136 is a protruding portion disposed at the upper edge of latch 130, for example. Fourth locking portion 138 is a protruding portion disposed at the lateral edge of latch 130, for example.

Figure 5:
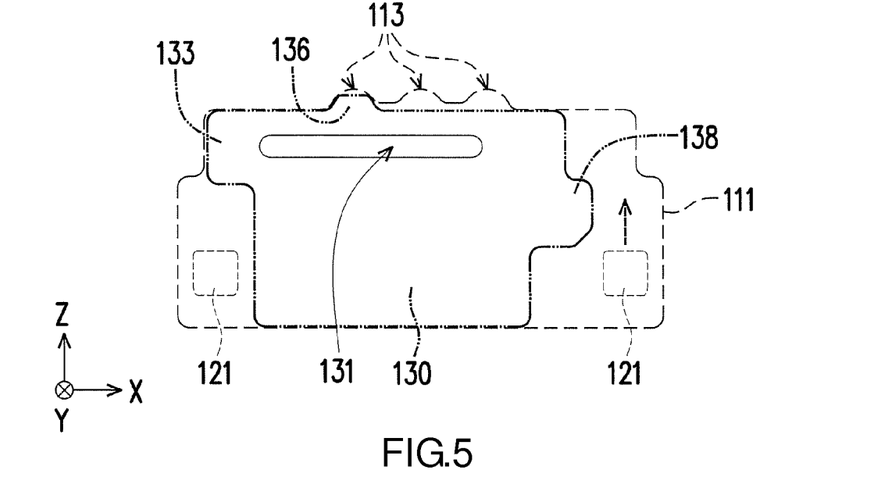
FIG. 5 and FIG. 6 are schematic views of latches operated with respect to a first door-leaf and a second door-leaf, respectively.
Figure 6:
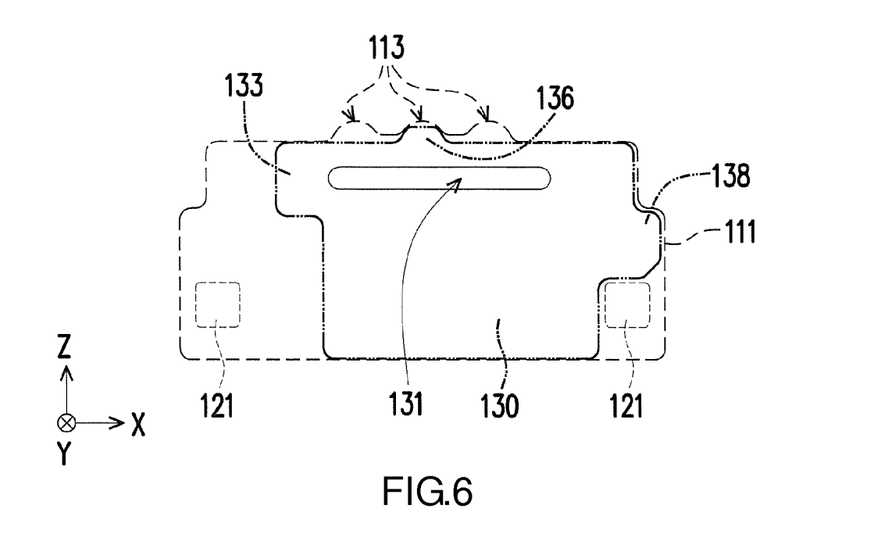

FIG. 5 and FIG. 6 are schematic views of latches operated with respect to a first door-leaf and a second door-leaf, respectively. FIG. 5 and FIG. 6 are drawn, with latch 130 viewed along Y-axis, wherein the observer observes gate structure 100 in the direction along Y-axis positively, and components are distinguished by their respective outlines. Referring to FIG. 5 and FIG. 6, in this embodiment, after first door-leaf 110, second door-leaf 120, and latch 130 of FIG. 3 or FIG. 4 have been put together, latch 130 can move within receiving chamber 111 of first door-leaf 110; at this point in time, three first locking portions 113 are located at the moving path of third locking portion 136 along X-axis, that is, as latch 130 is moving within receiving chamber 111, third locking portion 136 moves between three first locking portions 113 and gets positioned in different ones of first locking portions 113 because of their mutually matching outlines.

As latch 130 is moving within receiving chamber 111 to different locations therein, second locking portions 121 and fourth locking portion 138 correspond in position to each other. In this embodiment illustrated with FIG. 5, at this point in time, second locking portions 121 of second door-leaf 120 and latch 130 do not interfere with each other, and thus fourth locking portion 138 of latch 130 is not located at the moving path of second locking portions 121 along Z-axis. Since second locking portions 121 move along Z-axis positively (as indicated by the arrow shown in FIG. 5), second door-leaf 120 can move along Z-axis positively and will eventually be released from body 200, thereby allowing gate structure 100 to flip relatively to body 200, and opening or closing cavity 220.

After first door-leaf 110 of gate structure 100 has closed cavity 220 and second door-leaf 120 has moved Z-axis negatively and thus got engaged with body 200 (as shown in FIG. 1), the user may apply a force to push lever 140 to thereby move latch 130 along X-axis positively, such that third locking portion 136 is moved and positioned at the middle one of first locking portions 113. Hence, referring to FIG. 6, fourth locking portion 138 is blocked at the moving path of second locking portions 121 along Z-axis, and thus second door-leaf 120 cannot be moved along Z-axis positively and released from body 200; meanwhile, latch 130 fastens gate structure 100 in place, and thus first door-leaf 110 covers cavity 220 and is fixed thereto. To take electronic accessory 300 out of body 200, the user pushes push lever 140 to thereby drive latch 130 in a manner that third locking portion 136 moves back to the left one of first locking portions 113 (shown in FIG. 5), such that second door-leaf 120 resumes its movement along Z-axis.

Latch 130 further has hollowed-out portion 131 which extends along X-axis and is disposed alongside third locking portion 136, such that third locking portion 136 manifests flexibility along Z-axis to render it easy for third locking portion 136 to be moved and positioned between different first locking portions 113. Furthermore, latch 130 further has limiting portion 133 extending along X-axis, being disposed opposite to fourth locking portion 138, and corresponding in position to another second locking portions 121 of second door-leaf 120. Referring to FIG. 5, when fourth locking portion 138 does not block second locking portions 121, second door-leaf 120 can be moved along Z-axis positively and eventually released from body 200; meanwhile, limiting portion 133 is located at the moving path of another second locking portions 121, and thus second door-leaf 120 gets blocked at limiting portion 133 when released from body 200, thereby preventing second door-leaf 120 from coming off.

In general, during the design state of electronic device 10, similar components are designed to be structurally identical, so as to save production work and manufacturing costs effectively during a manufacturing process. Referring to FIG. 1, with body 200 being flanked by cavities 220, once gate structures comprising the same components are disposed at opposing ends of body 200, the opposite positions of the gate structures will necessitate different directions in which the gate structures are operated. For instance, if identical components are disposed in the right gate structure, the user will have to push push lever 140 along X-axis positively in order for latch 130 to disable a latched state of second door-leaf 120. However, the left gate structure renders it necessary for the user to push push lever 140 along X-axis negatively in order for latch 130 to disable the latched state of second door-leaf 120. As a result, the different operation directions are likely to cause troubles to the user. For a point of reference with respect to the left to body 200 or the right to body 200, refer to electronic device 10 shown in FIG. 1, wherein the user is located at a position suitable for operating the electronic device 10, that is, the user effectuates his or her reference position by facing electronic device 10, i.e., in the direction of X-axis positively, wherein the user's current operation direction distinguishes the left from the right.

Figure 7:
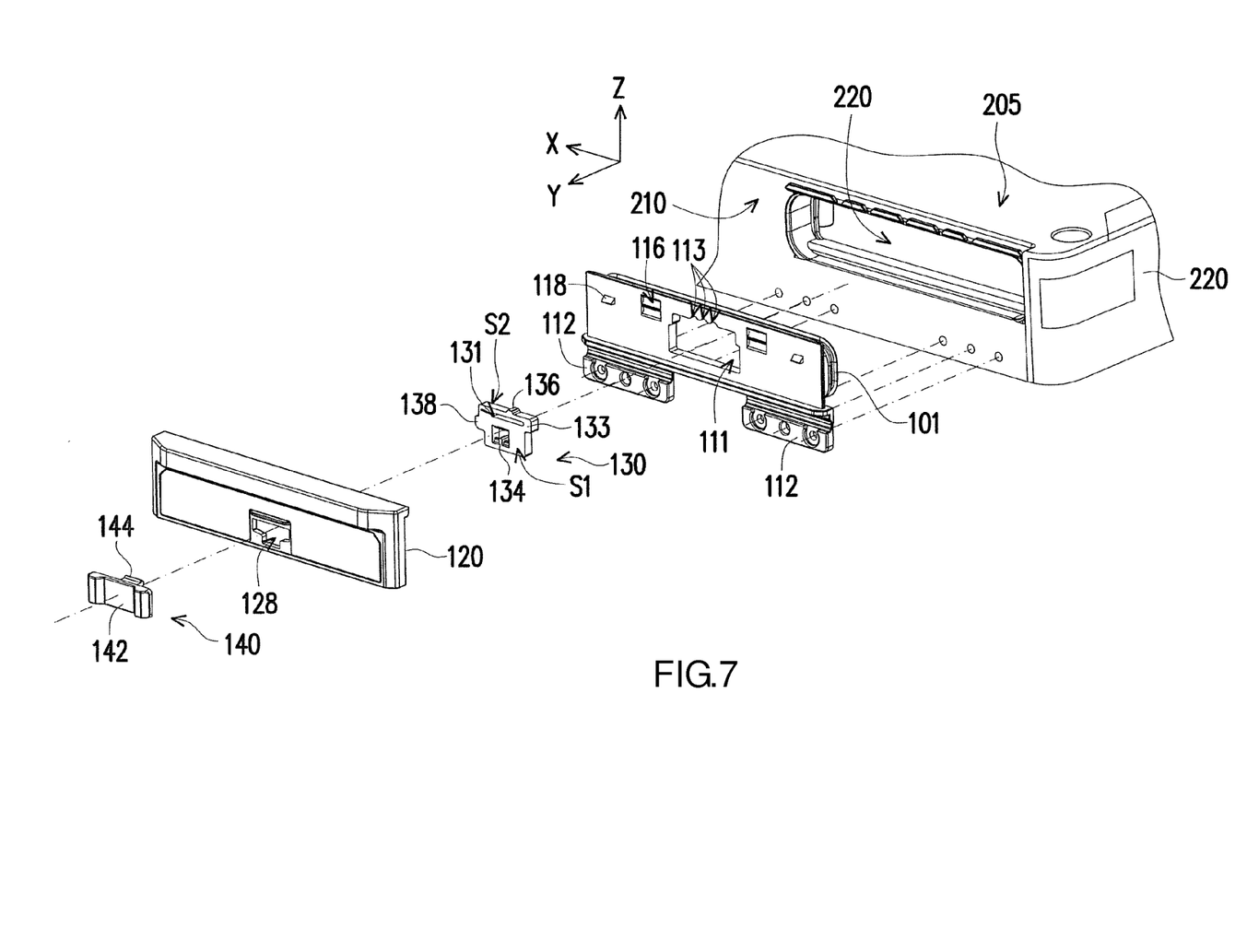
FIG. 7 is an exploded view of the other gate structure of FIG. 1.
Figure 8:
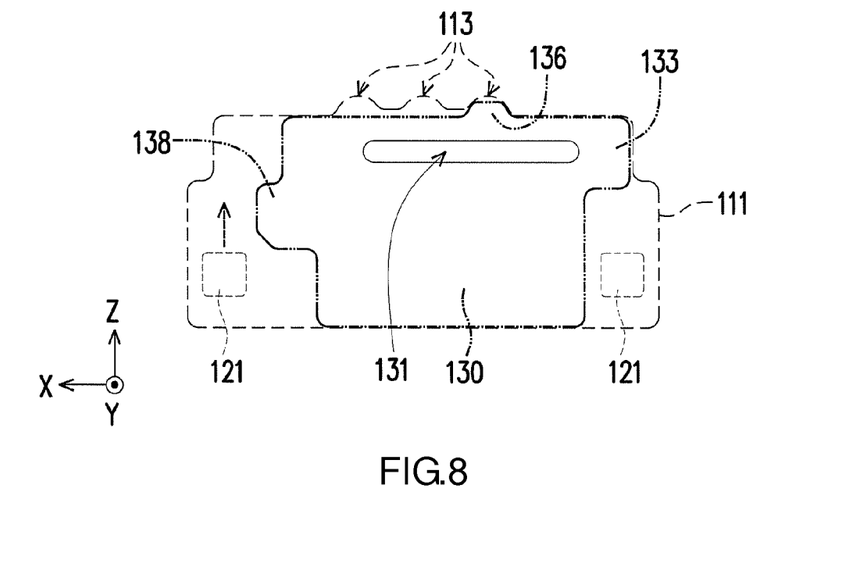
FIG. 8 and FIG. 9 are schematic views of the gate structure of FIG. 7 in different statuses, respectively.
Figure 9:
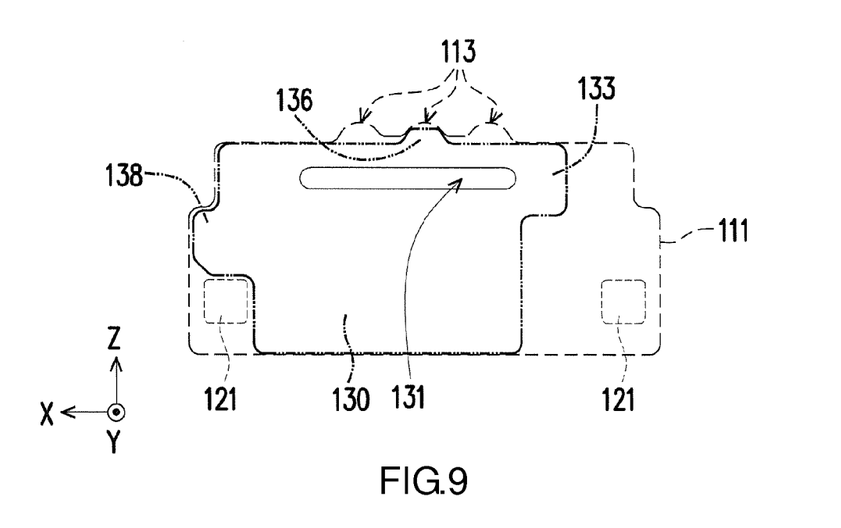

Gate structures 100 of the present invention preclude the aforesaid phenomenon. FIG. 7 is an exploded view of the other gate structure of FIG. 1, showing gate structure 100 disposed on the left of body 200. FIG. 8 and FIG. 9 are schematic views of the gate structure of FIG. 7 in different statuses, respectively. FIG. 8 and FIG. 9 match FIG. 5 and FIG. 6, respectively. Referring to FIG. 1, FIG. 7 through FIG. 9, body 200 has mirroring plane MR. Mirroring plane MR is parallel to X-Z plane and is disposed between left and right lateral surfaces 210. Gate structures 100 have mirror symmetry about mirroring plane MR. Referring to FIG. 3 and FIG. 7, with gate structures 100 comprising identical components, it is practicable not to describe the relationship between the components herein for the sake of brevity. Referring to FIG. 3 and FIG. 7, gate structures 100 have mirror symmetry about mirroring plane MR.

Referring to FIG. 3 and FIG. 4, latch 130 of gate structure 100 has a first surface S1 and a second surface S2 opposing the first surface S1. In the gate structure 100 disposed on the right of body 200, first surface S1 of latch 130 is in contact with first door-leaf 110, and second surface S2 of latch 130 is in contact with second door-leaf 120. By contrast, in the gate structure 100 disposed on the left of body 100, second surface S2 of latch 130 is in contact with first door-leaf 110, and first surface S1 of latch 130 is in contact with second door-leaf 120. Referring to FIG. 7, latches 130 at two opposing sides of body 200 have mirror symmetry, and thus fourth locking portion 138 is positioned distal to the user. Hence, from the user's perspective, it is necessary to push latches 130 at two opposing sides of body 200 along X-axis positively in order to fasten second door-leaf 120 in place. Likewise, when the user pushes latches 130 at two opposing sides of body 200 along Z-axis negatively, the fastened status of gate structures 100 at two opposing sides of body 200 can be disabled. Therefore, the same latch 130 can be smoothly operated in the two opposing gate structures 100. From the user's perspective, it is practicable to drive the latches 130 to move in the same direction in order to achieve fastening and unfastening, and in consequence the user can dispense with operation-related hassles.

In the aforesaid embodiment, the latches are also interchangeable. For instance, in an embodiment of the present invention, regarding latch 130 disposed on the right of body 200, its first surface S1 is in contact with second door-leaf 120, and its second surface S2 is in contact with first door-leaf 110. By contrast, regarding latch 130 disposed on the left of body 200, its first surface S1 is in contact with first door-leaf 110, and its second surface S2 is in contact with second door-leaf 120. Therefore, the user pushes the two opposing latches 130 along X-axis negatively to thereby fasten second door-leaves 120 in place and pushes the two opposing latches 130 along X-axis to thereby unfasten second door-leaves 120. Accordingly, the operation direction in this embodiment is opposite to the operation direction in the preceding embodiment.

Since the other components of gate structures 100 of the present invention are provided in the plural and arranged along X-axis (for example, three first locking portions 113 are arranged along X-axis, whereas two second locking portions 121 are arranged along X-axis), the assembly process of gate structures 100 merely entails putting together latches 130 which are disposed at two opposing sides of body 200 and have mirror symmetry, to not only perform the anticipated latching and unlatching functions regardless of whether latches 130 move along X-axis positively or negatively, but also enhance ease of use because the latching and unlatching functions can be attained even if the user drives latches 130 in the same direction.

In conclusion, in the aforesaid embodiments of the present invention, the gate structures provide effective protection to an electronic accessory disposed inside an electronic device, wherein latches operate in conjunction with locking portions of door-leaves, respectively, such that the door-leaves cover a cavity of the electronic device and are fixed thereto. Furthermore, the gate structures are disposed at two opposing sides of body and have mirror symmetry, whereas related components of the gate structures are provided in the plural and arranged in a moving direction; hence, the latching and unlatching of the second door-leaf can be attained even if the latches at two opposing sides of body are driven in the same direction by the user. Last but not least, the gate structures each comprise identical components to thereby save design time, production work, and costs, minimize user's confusion, and enhance ease of use.

The present invention is disclosed above by preferred embodiments. However, persons skilled in the art should understand that the preferred embodiments are illustrative of the present invention only, but should not be interpreted as restrictive of the scope of the present invention. Hence, slight changes and modifications made to the aforesaid embodiments by persons skilled in the art without departing from the spirit and scope of the present invention should fall within the scope of the present invention. Accordingly, the legal protection for the present invention should be defined by the appended claims.

What is claimed is:

1. A gate structure, adapted to open and close a cavity of an object, the gate structure comprising:
    a first door-leaf movably disposed in the cavity of the object and having three first locking portions;
    a second door-leaf disposed at the first door-leaf movably along a first axis to get engaged with the object or released from the object, such that the first door-leaf closes or opens the cavity, wherein the second door-leaf has two second locking portions; and
    a latch disposed at the first door-leaf movably along a second axis and disposed between the first door-leaf and the second door-leaf, wherein the latch has a third locking portion and a fourth locking portion,
    wherein the first axis is different from the second axis,
    wherein the three first locking portions are arranged along the second axis and located at a moving path of the third locking portion along the second axis,
    wherein, as soon as the second door-leaf gets engaged with the object and the third locking portion gets positioned at a middle one of the first locking portions, the fourth locking portion is blocked at a moving path of one of the second locking portions along the first axis, such that the first door-leaf covers the cavity and is fixed thereto.

2. The gate structure of claim 1, wherein the first door-leaf is pivotally connected to the object and disposed at a side of the cavity.

3. The gate structure of claim 1, wherein the first door-leaf has a receiving chamber facing the second door-leaf, wherein the latch is disposed in the receiving chamber and moves along the second axis, wherein the three first locking portions are disposed at an upper edge of the receiving chamber.

4. The gate structure of claim 1, further comprising:
    a push lever having a pushing portion and a connecting portion, the connecting portion passing through a slot of the second door-leaf to connect with the latch, and the pushing portion being disposed on a side of the second door-leaf, wherein the side of the second door-leaf faces opposed the first door-leaf.

5. The gate structure of claim 4, wherein the slot extends along the second axis.

6. The gate structure of claim 1, wherein the first axis is perpendicular to the second axis.

7. The gate structure of claim 1, wherein, when the third locking portion of the latch moves along the second axis from a middle one of the first locking portions to one of remaining ones of the first locking portions, the fourth locking portion exits a moving path of one of the second locking portions along the first axis, such that the second door-leaf is released from the object.

8. The gate structure of claim 1, wherein the second door-leaf further has a fifth locking portion disposed at an upper edge of the second door-leaf, and the object has a sixth locking portion, wherein the fifth locking portion matches the sixth locking portion, such that the second door-leaf is engaged with the object.

9. The gate structure of claim 1, wherein the latch further has a limiting portion extending along the second axis and disposed opposite to the fourth locking portion.

10. An electronic device, comprising:
    a body having two opposing lateral surfaces and two cavities disposed on the two lateral surfaces, respectively;
    two gate structures disposed on the two lateral surfaces, respectively, to open and close the two cavities, respectively, the gate structures each comprising:
    a first door-leaf movably disposed in the cavities of the body and having three first locking portions;
    a second door-leaf disposed at the first door-leaf movably along a first axis to get engaged with the body or released from the body, such that the first door-leaf closes or opens the cavities, wherein the second door-leaf has two second locking portions; and
    a latch disposed at the first door-leaf movably along a second axis and disposed between the first door-leaf and the second door-leaf, wherein the latch has a third locking portion and a fourth locking portion;
    wherein the first axis is different from the second axis,
    wherein the three first locking portions are arranged along the second axis and located at a moving path of the third locking portion along the second axis,
    wherein, as soon as the second door-leaf gets engaged with the object and the third locking portion gets positioned at a middle one of the first locking portions, the fourth locking portion is blocked at a moving path of one of the second locking portions along the first axis, such that the first door-leaf covers the cavity and is fixed thereto,
    wherein the two latches of the two gate structures move along the second axis and in a first direction, respectively, such that the third locking portion moves to the middle one of the first locking portions.

11. The electronic device of claim 10, wherein the body has a mirroring plane disposed between the two lateral surfaces, and the two latches of the two gate structures have mirror symmetry about the mirroring plane.

12. The electronic device of claim 10, wherein the latches each have a first surface and a second surface opposing the first surface, wherein the first surface of the latch of a said gate structure is in contact with the first door-leaf, wherein the second surface of the latch of said gate structure is in contact with the second door-leaf, wherein the second surface of the latch of another said gate structure is in contact with the first door-leaf, wherein the first surface of the latch of the other said gate structure is in contact with the second door-leaf.

13. The electronic device of claim 10, wherein, in each said gate structure, the first door-leaf is pivotally connected to the object and disposed at an end of the cavity.

14. The electronic device of claim 10, wherein, in each said gate structure, the first door-leaf has a receiving chamber facing the second door-leaf, and the latch is disposed in the receiving chamber and moves along the second axis, wherein the three first locking portions are disposed at an upper edge of the receiving chamber.

15. The electronic device of claim 10, wherein each said gate structure further comprises:
    a push lever having a pushing portion and a connecting portion, the connecting portion passing through a slot of the second door-leaf to connect with the latch, and the pushing portion being disposed on a side of the second door-leaf, wherein the side of the second door-leaf faces opposed the first door-leaf.

16. The electronic device of claim 15, wherein, in each said gate structure, the slot extends along the second axis.

17. The electronic device of claim 10, wherein, in each said gate structure, the first axis is perpendicular to the second axis.

18. The electronic device of claim 10, wherein, in each said gate structure, when the third locking portion of the latch moves along the second axis from a middle one of the first locking portions to one of remaining ones of the first locking portions, the fourth locking portion exits a moving path of one of the second locking portions along the first axis, such that the second door-leaf is released from the object,
 wherein the two latches of the two gate structures move along the second axis and in a second direction, respectively, wherein the second direction is opposite to the first direction.

19. The electronic device of claim 10, wherein, in each said gate structure, the second door-leaf further has a fifth locking portion disposed at an upper edge of the second door-leaf, and the body has a sixth locking portion, wherein the fifth locking portion matches the sixth locking portion, such that the second door-leaf is engaged with the body.

20. The electronic device of claim 10, wherein, in each said gate structure, the latch further has a limiting portion extending along the second axis and disposed opposite to the fourth locking portion.

\* \* \* \* \*